Sept. 27, 1960   C. S. MORRISON ET AL   2,954,071
SEAT

Original Filed July 12, 1954

INVENTORS
C. S. MORRISON &
B. M. SILVERBERG

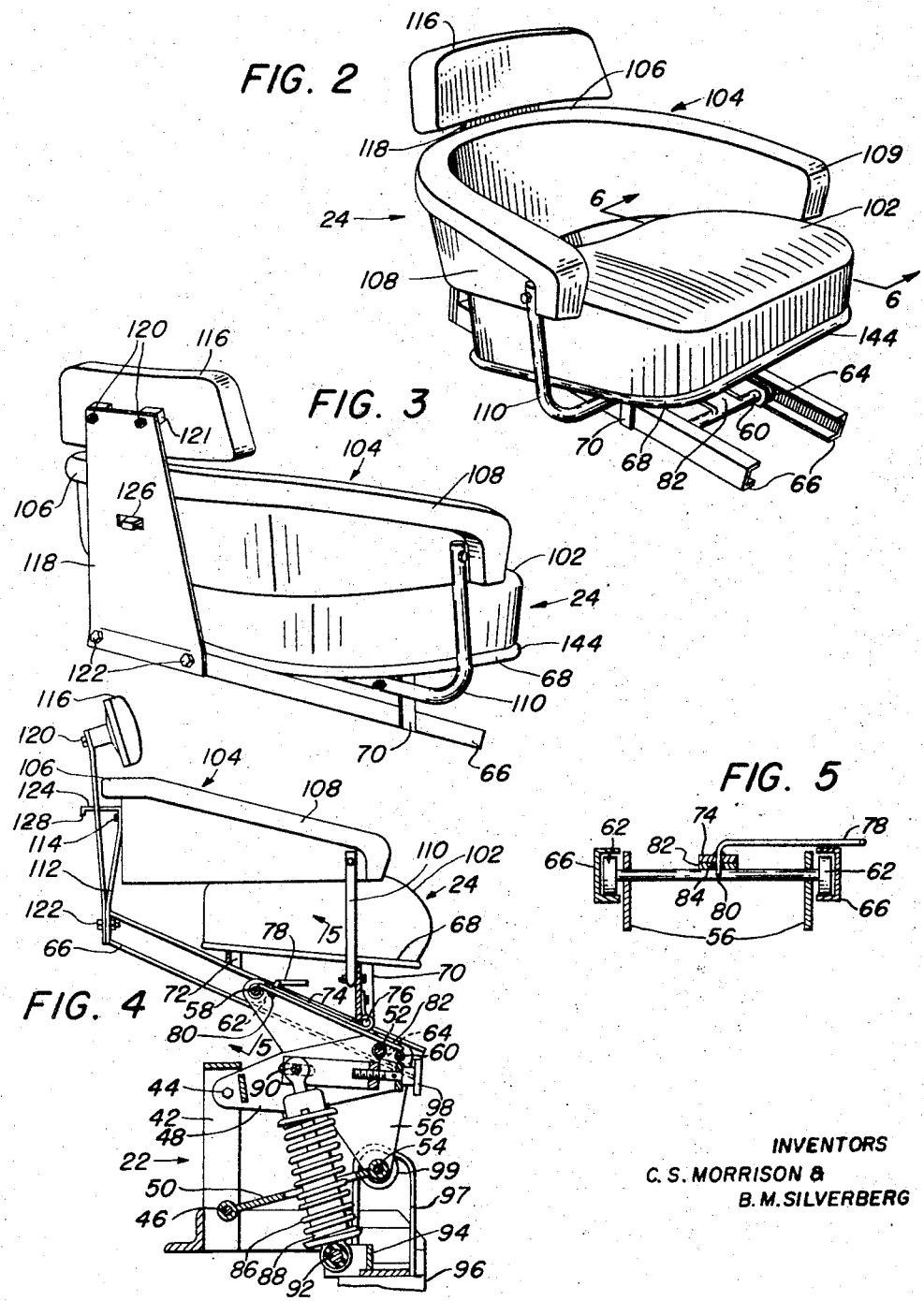

United States Patent Office 2,954,071
Patented Sept. 27, 1960

2,954,071

SEAT

Charles S. Morrison, Moline, Ill., and Bernard M. Silverberg, Milwaukee, Wis., assignors, by mesne assignments, to Deere & Company, a corporation of Delaware Original application July 12, 1954, Ser. No. 442,756. Divided and this application Mar. 19, 1958, Ser. No. 722,448

7 Claims. (Cl. 155—14)

This invention relates to a seat and more particularly to a seat for an agricultural vehicle such as a tractor. The application is a division of assignee's copending application, Ser. No. 442,756, filed July 12, 1954, now Patent No. 2,932,341.

It is a feature of the invention to provide an arrangement of the seat in such manner that it can be adjusted rearwardly uphill and forwardly downhill. This arrangement, in association with a novel foot rest structure, adequately accommodates the seating arrangement to riders of all sizes. The sloping foot rest provides an angle of approximately 90° at the angle joint while the included knee angle is approximately 135° which provides for efficient bracing of the pelvis against the seat back. The knee angle must not be less than approximately 90° when the feet are positioned on the level portion of the platform. The thighs are sloped slightly downward to enable the operator to lean forward without encountering the discomfort and fatigue which would result from an acute angle at the hip joint. For example, an extremely tall rider having relatively long legs will require a seat that is not only farther rearwardly from the steering wheel but also higher above the platform. The short rider will require a seat that is both lower and closer to the steering wheel. The angle of the foot rest is related to the angle at which the frontal portion of the seat slopes and, even though the tall operator is more distant from the steering wheel, the arrangement is such that he has utmost comfort in a static position. The suspension of the seat is depended upon to afford the necessary flexibility in opposite vertical directions and will normally include a yieldable support in combination with some form of shock absorbing means, the details of which are not important here except as an adjunct to the over-all comfortability characteristics of the seat.

The foregoing and other important objects and desirable features of the invention are attained in a preferred embodiment thereof as described in the following specification and as illustrated in the accompanying sheets of drawings, the several figures of which will be described immediately below.

Fig. 2 is a another perspective view of the seat by itself as seen from the front and one side.

Fig. 3 is another perspective view of the seat shown in Figs. 1 and 2, as seen from the rear and one side.

Fig. 4 is an elevational view, partly in section, showing the seat and one form of suspension means therefor.

Fig. 5 is a transverse sectional view on an enlarged scale as seen along the line 5—5 of Fig. 4.

Figure 1:
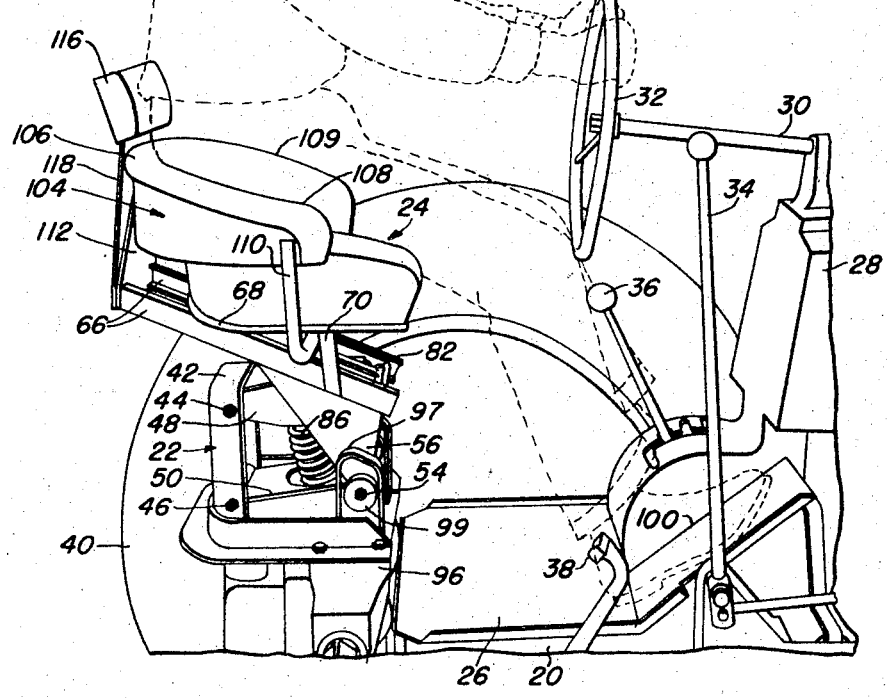
Fig. 1 is a perspective view of the improved seat as mounted on a tractor and illustrating in dotted lines the position of a rider or operator carried by the seat.

The rear portion of a conventional agricultural tractor is illustrated in Fig. 1. The tractor has a rear body portion 20 on which is mounted a seat support element 22. A seat element, designated in its entirety by the numeral 24, is carried by the support element 22. A level floor or platform 26 is carried by the body portion 20 just ahead of the seat 24 and affords a space on which the operator may stand if he so desires. Visible in part at 28 is a portion of the tractor hood over which a steering wheel shaft 30 projects rearwardly to carry a steering wheel 32. Other control members are conveniently grouped for operation by an operator riding on the seat 24 or standing on the platform 26; these include a clutch control lever 34, a gear shift lever 36 and a brake pedal 38. Also visible in Fig. 1 is the left-hand traction wheel 40. Here, as elsewhere throughout this description, the terms "right" and "left" are used with reference to the position of an observer standing behind the tractor and looking forwardly.

Although the particular seat support element or suspension system illustrated is covered by U.S. Patent No. 2,840,140 and thus forms no part of the present invention, it will be described somewhat in detail for the purposes of orienting the remainder of the seat design. As best shown in Figs. 1 and 4, the support element comprises an upright U-shaped member 42 to which are pivoted at 44 and 46 upper and lower forwardly extending links 48 and 50. The forward ends of these links are pivotally connected at 52 and 54 to triangular structure 56 that includes a pair of fore-and-aft spaced apart transverse shafts 58 and 60. Opposite ends of the shafts 58 and 60 carry rollers or followers 62 and 64 which ride in channels 66 secured to and forming a base frame for the seat 24. These channels also serve as guide means for enabling fore-and-aft adjustment of the seat 24 relative to the support element or suspension means 22. Part of the base frame for the seat includes a seat pan 68 which is rigidly connected to the channels 66 as by front and rear upright supports 70 and 72. The base frame structure and seat are thus movable as a unit selectively in opposite directions along a rearwardly and upwardly or downwardly and forwardly inclined path because of the relationship between the rollers 62, 64 and the channels 66, the rollers being carried, as stated above, by the cross shafts 58 and 60 which are in turn carried by the triangular structure 56 of the suspension means 22. Any selected position of adjustment of the seat may be secured by latch means comprising a strap 74 pivoted at 76 to the transverse upright support 70 and having a rear portion provided with a handle 78 and a locking pin portion 80. A fixed strap 82 extends fore-and-aft between the roller shafts 58 and 60 and has therein a plurality of fore-and-aft spaced apart apertures, one of which is visible at 84, in Fig. 5. Thus, the apertured strap 82 is carried by the suspension 22 and the latch strap 74 is carried by the seat 24. Consequently, when the handle 78 is lifted to retract the pin 80 from one of the apertures 84, free fore-and-aft adjustment along the inclined path mentioned may be obtained, after which the latch may be released and the pin 80 will drop into another aperture 84.

Vertical flexibility of the suspension is controlled by yielding means in the form of a coiled compression spring 86 within which is contained a shock-absorbing unit 88, preferably of the hydraulic type. The unit 86—88 is connected at opposite ends respectively at 90 and 92 to the upper links 48 and to a bracket 94 mounted on a rear housing part 96 of the tractor body 20. Fore-and-aft adjustability of the connection 90 is afforded by adjusting means, designated generally by the numeral 98, the details of which are unimportant here. Suffice it to say that the adjustment varies the preload or height of the spring 86 as well as the distance between the points 44 and 90, to accommodate the suspension to riders of different weights. Figs. 1 and 4 show an upstanding loop 97 which functions as a stop that is engageable with a rubber cushion 99 carried at each end of the lower pivot shaft 54 of the suspension linkage. The stop thus provided limits upward travel of the seat.

From the description thus far, it will be seen that the seat 24 is carried by the suspension means 22 for substantially vertical movement, which movement is controlled in part by the parallel links 48 and 50 and in part by the spring and shock-absorber unit 86—88. Adjustment of the seat along the line of the channels 66 is accomplished by the use of the latch means 78, and thus the fore-and-aft position of the seat relative to the steering wheel 32 and other controls 34, 36 and 38 may be varied. Additionally, the height of the seat above the level of the floor 26 will be varied as the seat is adjusted fore and aft. This is an important convenience to riders of different heights, because the shorter rider is more comfortable when he is closer to the steering wheel and, since the seat moves also downwardly when it moves forwardly, his legs are more readily accommodated to the pedal 38 and other foot-operated controls. As a further adjunct to the arrangement and adjustability of the seat, the platform 26 has a foot rest portion 100 which rises from the front edge of the floor 26 to an angle on the order of 20 to 30 degrees to the horizontal. An angle in this range has been calculated to be best suited to the normal or relaxed position of an operator's leg, having due regard to the tensioning of muscles in the leg and in the foot and further having regard to the angle assumed between the thigh and the lower leg. In association with this feature is the adjustability of the seat along the inclined path mentioned, which path is at an angle on the order of 20 to 30 degrees to the horizontal. The range of rearward movement of the seat is quite large so that if the operator desires to operate the tractor while standing on the platform 26, he may move the seat to its maximum rear position. The padded surface extends forwardly of the front edge of the seat pan to preclude injury to the back of the legs. In this respect, it should be noted that there are many phases of operation of a tractor in which the operator may desire to stand, not only as a change from a seated position but also to enable him to rise above the dust level or to observe some characteristic peculiar to the specific operation.

The seat 24 includes, in addition to the seat pan 68, a seat cushion 102 of yieldable material such as any conventional type of so-called foam rubber, which material is appropriately covered by a fabric or plastic coating not separately designated by a numeral, since details such as that are unimportant. The seat additionally includes a U-shaped element, designated generally by the numeral 104, which embraces the seat from the rear, having a transverse rear or back portion 106 and right- and left-hand side portions 108 and 109. The interior surface of the element 104 rises above the general plane or surface of the seat cushion 102 and is clear of the seat cushion for ventilation and so that the cushion may have vertical flexibility without interference from the element 104. The element is upholstered in any suitable manner, preferably by the same material used in the seat cushion 102. The element is rigidly mounted on the base frame 66 by means of a front support 110 and by means of a rear support 112 (Figs. 1 and 4). This rear support comprises an upright member rigidly secured at its lower end to the rear ends of the channels 66 and rigidly secured at its upper end at 114 to a rear outer portion of the back part 106 of the U-shaped element 104. These features form the subject matter of Patent No. 2,932,341, noted above.

When an operator or rider is seated on the cushion 106, his pelvic area is confined at least at the rear end at opposite sides by the U-shaped element 104. Apart from the resilience imparted to the element 104 by the upholstery material, the element is rigid. Thus, the confinement of the operator is one assuring not only adequate comfort but safety. The back portion 106 affords rear support to the rear pelvic area of the rider and the side parts 108 and 109 provide safety from sliding or being thrown sidewise from the seat. The side parts 108 and 109 slope downwardly and forwardly to provide arm rests and these arm rests terminate short of the front end of the seat cushion 102, thus enabling the operator to have relatively free lateral movement of his legs ahead of the arm rests, which aids not only in his mounting on and dismounting from the tractor but permits a certain amount of relaxation incident to changing of positions during riding. The support 110 is so shaped as to afford a convenient hand grip as an aid to the rider in getting on and off the tractor. The embracing relationship of the U-shaped element 104 to the pelvic and hip area of the rider can be best perceived in Fig. 1, wherein it will be noted that the waist area of the rider is above the upper edge of the element.

A further characteristic of the seat 24 is the use of a yieldable back rest 116 which rises above the back part 106 of the element 104. The back rest is carried on resilient means in the form of an upright member 118 secured at its upper end to the back rest as by bolts 120 and rubber mountings 121 and secured to the rear ends of the channels 66 by cap screws 122 which function also to mount the upright 112 on the channels 66. The upright or resilient member 118 is of material having an inherent amount of flexibility so that the back rest is yieldable in a rearward direction from a normal position substantially in vertical alinement with the rear part 106 of the U-shaped element 104. However, uncontrolled yieldability of the back rest 116 is undesirable. For this reason, stop means is provided between the uprights 112 and 118. The specific type of stop means illustrated here comprises a rearwardly projection tongue 124 on the upper end of the element support 112, which tongue passes through an aperture 126 in the resilient support 118, the tongue having a hooked rear end 128 to afford a stop engageable with a longitudinal portion of the resilient member 118 about the aperture 126. The arrangement is such that although the pelvic area of the rider is confined by the U-shaped element 104, the upper portion of the rider may yield rearwardly if desired to contact the back rest 116 which is automatically alined to the lumbar region by means of the mountings 121 and resilient uprights 118. The stop means 124—126—128 constitutes a safety feature that prevents the operator from tumbling rearwardly off the seat 24.

The avoidance of extremely technical anatomical language has been observed, in the interests of clarity and convenience. However, the characteristics of the seat relative to the anatomy of the rider will be readily appreciated by persons schooled in this subject.

Various features of the invention not specifically enumerated will readily occur to those versed in the art, as will minor departures from the specific structure illustrated, all of which may be achieved without departing from the spirit and scope of the invention.

What is claimed is:

1. An adjustable seat structure for a tractor having a rear body portion including a platform and a steering wheel above the platform, said seat structure comprising: a support element on the tractor body portion rearwardly of the platform and steering wheel; a seat element positioned above the support element to support a rider at selected distances behind the steering wheel and at selected levels above the platform; ramp means interposed between the support and seat elements and inclining rearwardly uphill; guide follower means movable selectively uphill and downhill along the ramp means; means mounting the ramp means on one of the elements; means mounting the follower means on the other element; and releasable locking means cooperative between the ramp and follower means and lockable for securing a fixed position of the seat element relative to the support, said locking means being releasable to enable adjustment of the seat element uphill and downhill relative to the support element.

2. An operator's seating arrangement for a tractor having a body including a platform and a steering wheel, comprising: a seat support rearwardly of the steering wheel; a seat mounted on the support and having front and rear edges, said front edge being rearwardly of and at a level below the bottom of the steering wheel, said seat having an upper seating surface including a rear, operator-carrying portion extending from the rear edge to a zone short of the front edge and a forward portion sloping downwardly and forwardly from said zone to the front edge of the seat at an angle on the order of ten to thirty degrees to the horizontal; and a foot rest rising from the platform ahead of and below the steering wheel at an upward and forward angle on the order of twenty to thirty degrees to the horizontal.

3. The invention defined in claim 2, including: means mounting the seat on the support for fore-and-aft adjustment of the seat relative to the support, steering wheel and foot rest along an upward and rearward angle on the order of twenty to thirty degrees to the horizontal.

4. The invention defined in claim 2, in which: the rear, operator-supporting portion of the seating surface slopes rearwardly and downwardly from said zone to the rear edge of the seat at an angle on the order of one to five degrees to the horizontal.

5. An adjustable seat structure for a tractor having a rear body portion including a platform and a steering wheel above the platform, said seat structure comprising: a support element on the tractor body portion rearwardly of the platform and steering wheel and including front and rear ends and opposite sides; a front pair of laterally spaced apart rollers carried by the support element at its front end, one at each side of said support element, for rotation on a common relatively low transverse front axis; a rear pair of laterally spaced apart rollers carried by the support element for rotation on a common relatively high transverse rear axis, said rear rollers being respectively alined fore-and-aft with and rearwardly uphill from the front rollers; a seat element positioned above the support element to support a rider at selected distances behind the steering wheel and at selected levels above the platform; a pair of laterally spaced apart elongated fore-and aft tracks carried by and beneath the seat element and received respectively by the front and rear rollers to carry the seat element for movement rearwardly uphill and forwardly downhill; said tracks being longer than the fore-and-aft spacing between the front and rear rollers to enable the seat element to attain an extreme relatively low forward position and an extreme relatively high rear position; and means for selectively locking the seat in any one of a plurality of positions intermediate said extreme positions.

6. An adjustable seat structure for a tractor having a rear body portion including a platform and a steering wheel above the platform, said seat structure comprising: a support element on the tractor body portion rearwardly of the platform and steering wheel and including front and rear ends and opposite sides; a front pair of laterally spaced apart rollers carried by the support element at its front end, one at each side of said support element, for rotation on a common relatively low transverse front axis; a rear pair of laterally spaced apart rollers carried by the support element for rotation on a common relatively high transverse rear axis, said rear rollers being respectively alined fore-and-aft with and rearwardly uphill from the front rollers; a seat element positioned above the support element to support a rider at selected distances behind the steering wheel and at selected levels above the platform; and a pair of laterally spaced apart elongated fore-and-aft tracks carried by and beneath the seat element and received respectively by the front and rear rollers to carry the seat element for movement rearwardly uphill and forwardly downhill; said tracks being longer than the fore-and-aft spacing between the front and rear rollers to enable the seat element to attain an extreme relatively low forward position and an extreme relatively high rear position.

7. An adjustable seat structure for a tractor having a rear body portion including a steering wheel and a platform below the steering wheel and extending rearwardly to a rear portion spaced rearwardly from the steering wheel, said seat structure having a support on the tractor body rearwardly of the platform and having a front end portion rising generally at said rear portion of the platform and generally delineating the rear lower part of a standing zone occupied by a rider standing on the platform; a seat positioned above the support in general parallelism with the ground to carry a seated rider, said seat having a front edge portion; and means mounting the seat on the support for movement through a fore-and-aft and uphill and downhill range including a relatively low forward position in which the front edge portion extends forwardly beyond the front end of the seat and overhangs the platform and a relatively high rear position in which said front edge portion of the seat is substantially vertically alined with the front end of the support so as to remove the front portion of the seat from the aforesaid standing zone.

References Cited in the file of this patent

UNITED STATES PATENTS

| | | |
|---|---|---|
| 657,360 | Ritter | Sept. 4, 1900 |
| 1,108,030 | Turner | Aug. 18, 1914 |
| 2,669,317 | Celien | Feb. 16, 1954 |
| 2,788,842 | Ohlenkamp | Apr. 16, 1957 |